United States Patent

Derr, Jr.

[15] 3,679,231

[45] July 25, 1972

[54] TRAILER HITCH

[72] Inventor: Millard A. Derr, Jr., 17 Richard Court, Orinda, Calif. 94563

[22] Filed: May 25, 1970

[21] Appl. No.: 40,068

[52] U.S. Cl. .................................. 280/406 A, 280/491 E
[51] Int. Cl. .......................................................... B60d 1/06
[58] Field of Search ........................... 280/406 A, 406, 489

[56] References Cited

UNITED STATES PATENTS

| | | | |
|---|---|---|---|
| 3,185,499 | 5/1965 | Reese | 280/406 A |
| 3,220,749 | 11/1965 | Mathisen | 280/406 A |
| 3,441,291 | 4/1969 | Morris | 280/406 A |
| 3,490,788 | 1/1970 | Mann | 280/406 A |

*Primary Examiner*—Leo Friaglia
*Attorney*—Townsend and Townsend

[57] ABSTRACT

A trailer hitch which has a head demountably securable to a rearwardly extending mounting bar of the vehicle. The head permits substantial vertical adjustments before its installation to obtain standard spacings between it and the ground and includes laterally protruding flanges that mount identical load equalizing spring bar connectors. The connectors are retained to the flanges while they pivot about upright axes over a predetermined sector and can be removed from the head when they pivot through other sectors. The pivot axes are slightly inclined from the vertical. The spring bars are longitudinally tapered, retained in rearwardly directed openings in the connectors and include tensioning chains at their free aft ends secured to a retention member mounted to a forwardly extending trailer bar of the trailer. A chain engaging lever enables the simultaneous tensioning of the chain and its connection to or release from the chain retention member.

15 Claims, 6 Drawing Figures

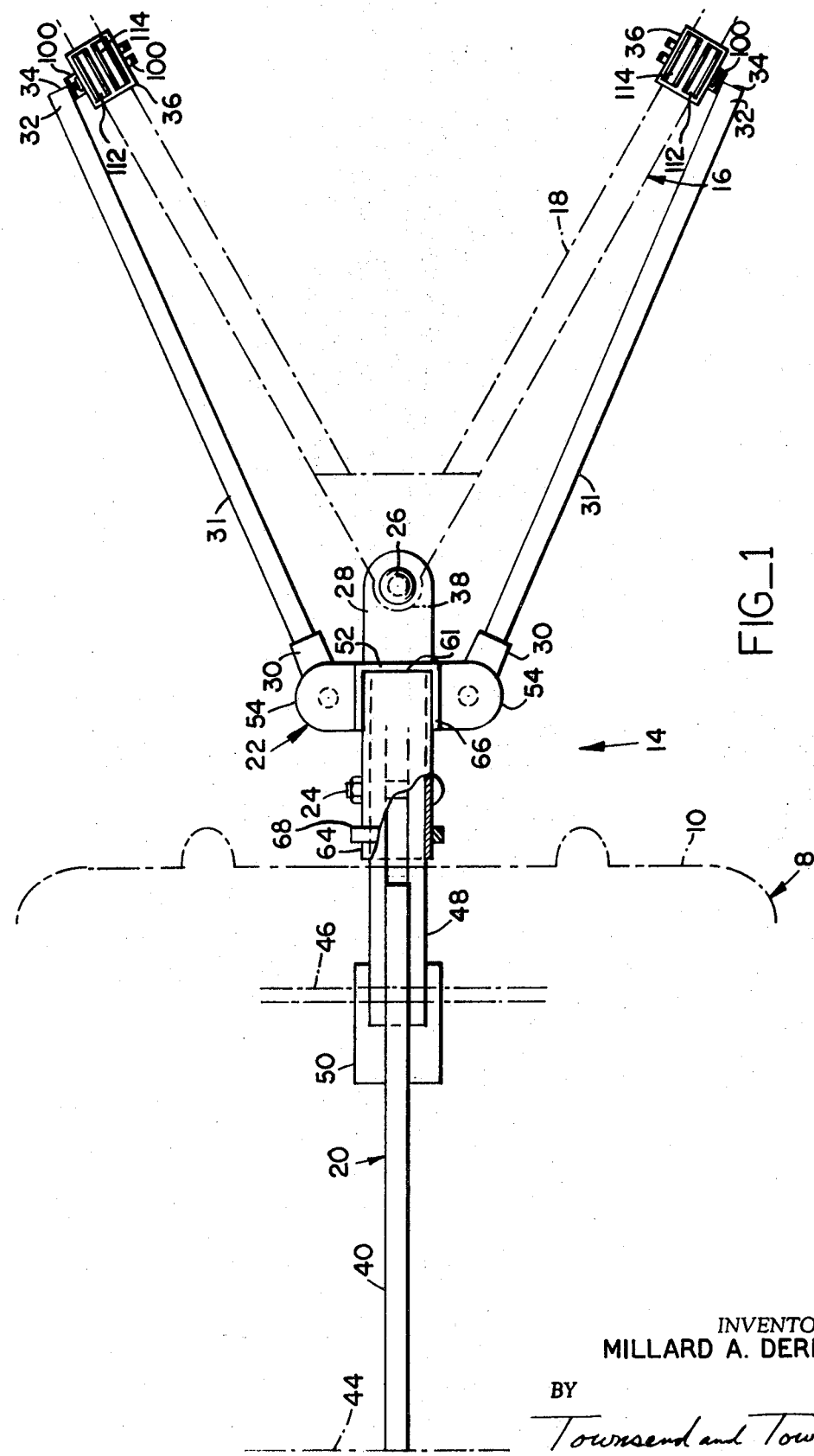

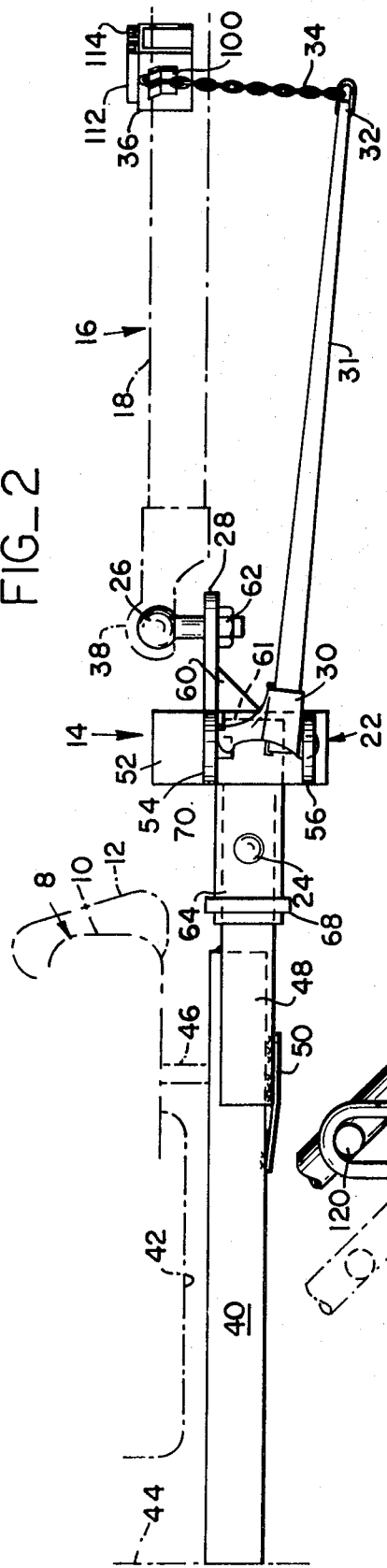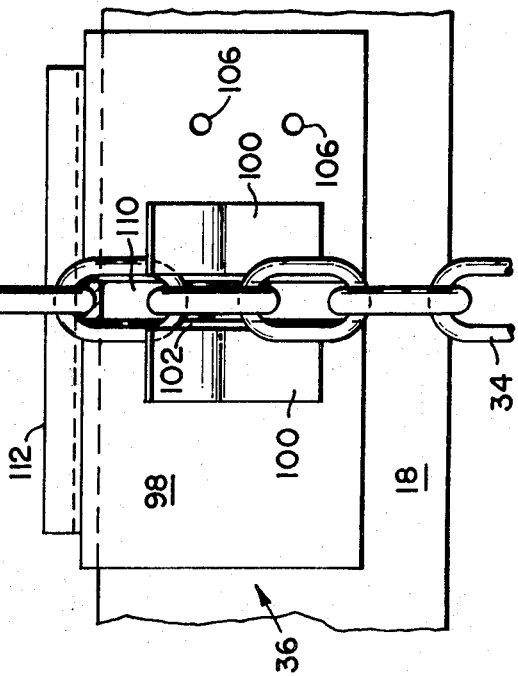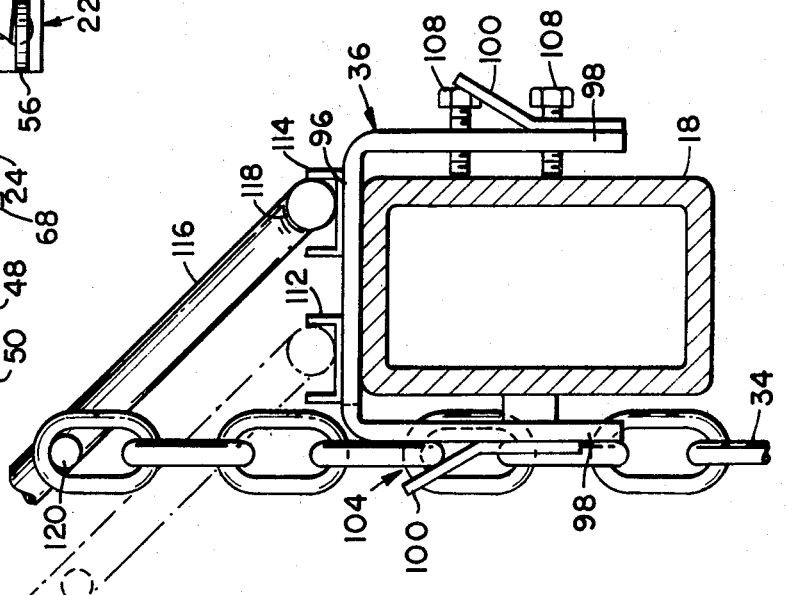

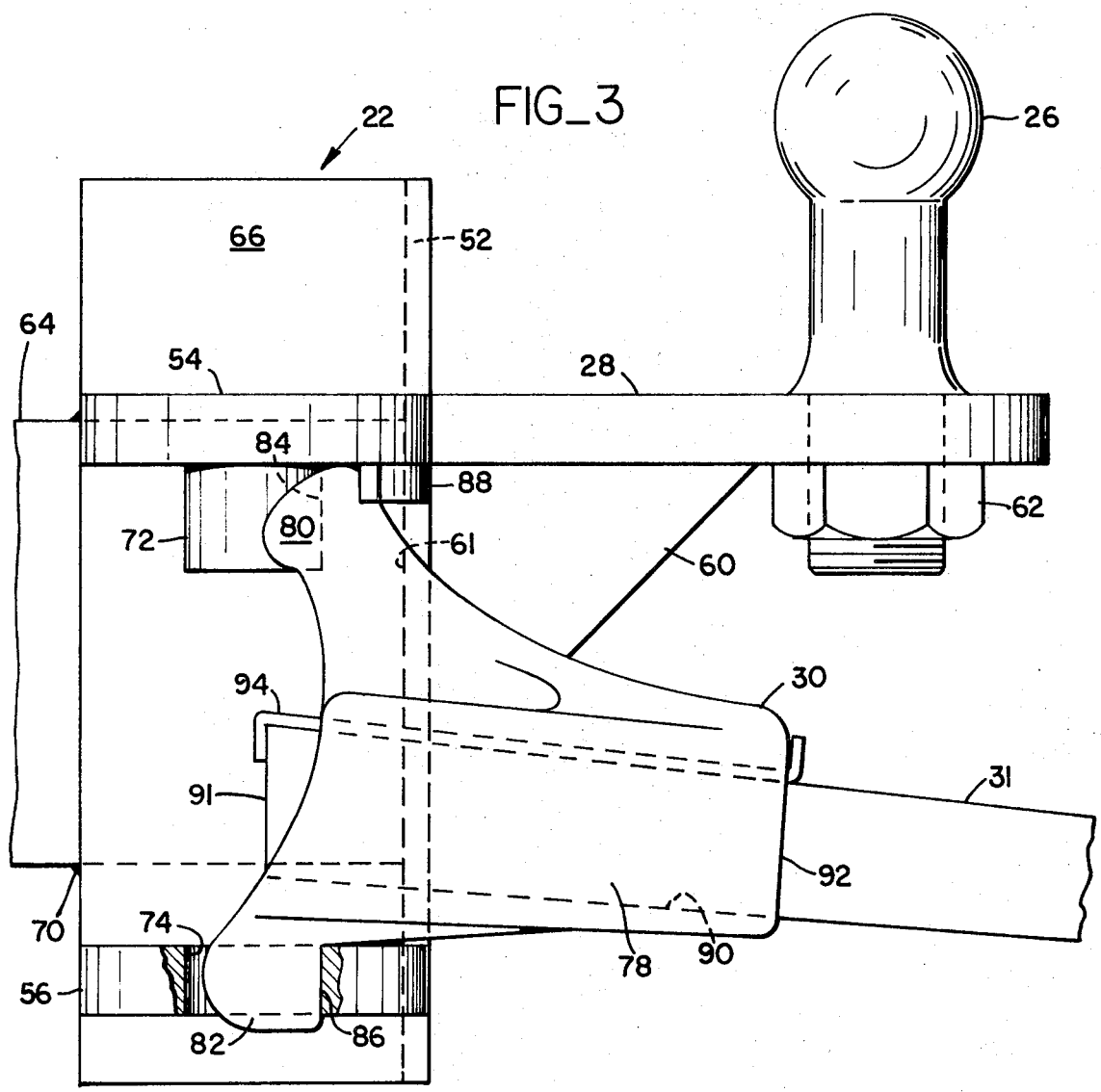
FIG_3
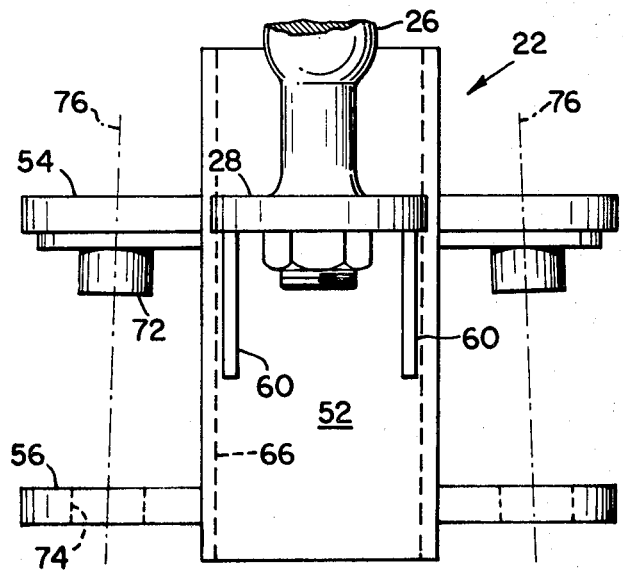
FIG_4
INVENTOR.
MILLARD A. DERR, JR.
BY
Townsend and Townsend
ATTORNEYS

3,679,231

TRAILER HITCH

BACKGROUND OF THE INVENTION

Due to the large number of relatively large and heavy trailers on today's highways increased attention is being paid to the problem of securely, effectively and relatively inexpensively connecting the trailer to the towing vehicle. A large variety of trailer hitches is presently available on the market and an even larger variety has been proposed. The various known trailer hitches have certain advantages and shortcomings but generally fail to fully satisfy the need for a high quality and safe load equalizing trailer hitch.

On certain load equalizing trailer hitches which employ tensioned spring bars secured to the trailer bar of a trailer to transmit moment arms from the trailer to the vehicle and thereby reduce the weight carried by the aft wheels of the vehicle and transfer a portion of such weight to the front wheels of the vehicle as well as back to the trailer wheels, specially forged left and right hand spring bars were secured to the head. Removal of the spring bars from the head, as during storage to reduce the bulkiness of the trailer hitch, required tedious disassembly work. The special forgings as well as the required left and right hand parts significantly increased the cost of prior art load equalizing trailer hitches. Permanent deformation of a spring bar, a not infrequent occurrence when the spring bar is overloaded, could render some types of spring bars useless unless reworked to return them to their original position. Also, any change of spring bar capacity requires a head change as well as a spring bar change.

The pretensioning of prior art spring bars is a formidable task. Usually chain engaging hooks are secured, e.g. welded, to the trailer bar and the tensioning of the spring and the chain before the latter is engaged with the hooks is left to the ingenuity of the owner of the hitch. Consequently, the coupling of the trailer to a vehicle by means of a load equalizing trailer hitch often constitutes a formidable, time consuming and physically demanding task. The relatively few available chain tensioning means consist of costly and complicated devices that are prone to malfunctioning and could lead to possible injuries of the operator.

Prior art load equalizing spring bars are mounted for pivotal movements about vertical axes. During turns the inside spring bar generates a moment about the longitudinal axis of the vehicle which significantly increases the load on the outside wheels of the towing vehicle and tends to tip the vehicle over and gives the driver of the vehicle the feeling of loss of control over it. Aside from the constant anxiety to which the driver is subjected, the lateral moment acting on the vehicle, especially during turning maneuvers, can cause undesirable motions of the vehicle and can lead to serious accidents.

Other shortcomings of prior art trailer hitches includes relatively heavy and clumsy coupling heads that are removably mounted to the towing vehicle by inserting a portion of the head into a rearwardly protruding tubular member mounted to the towing vehicle. When not in use the head is removed. The tubular member, however, remains on the vehicle and, due to its relatively low clearance when installed on at least certain vehicles, frequently scrapes on the pavement when the vehicle moves through a depression in the roadway. It is furthermore often difficult to maintain the hollow member clean and free of contaminants that might prove difficult to remove when the hitch is to be used and the hollow member is susceptible to bending during minor collisions.

Furthermore, prior art trailer hitches provide inadequate adjustments of the relative elevation of the trailer head with respect to the roadway. This makes installation of the trailer hitch difficult, permits only limited height variations so that on certain vehicles it is difficult to obtain a desired standard height of the head above ground, and/or requires the use of relatively expensive special tall or low hitch ball mounting heads. Additionally, prior art trailer hitches, and especially the more satisfactory load equalizing hitches, are expensive to manufacture and install.

SUMMARY OF THE INVENTION

In its broadest aspect the present invention provides a trailer hitch comprising shank means for permanent attachment to a towing vehicle so that a free end of the shank means is adjacent the rear end of the vehicle. A head including means for receiving a ball hitch element has a tubular member sized for placement over the shank means to connect the head to the vehicle. Means such as threaded bolts, pins and the like demountably secure the tubular member to the shank means.

The head includes sets of opposing laterally extending, vertically spaced flanges to which substantially identical spring bar connection means for each set of opposing flanges is demountably secured. The spring bar connecting means are pivotally movable about laterally spaced upright axes and include means securing a spring bar to each connecting means and, with each set of opposing flanges, define means for the transmission of moments acting about substantially horizontal axes from the spring bars to the flanges and the vehicle. Means are further provided for applying substantially vertically acting forces to free aft ends of the spring bars to generate the moments.

The head is fabricated from standard structural components and plate, is lightweight and, therefore, readily manipulated and is so constructed that the spring bars are demountably secured to the head and are raised to about the level of the ball hitch mount so that road clearance is not impaired by the bars. The connectors for both spring bars are identical and, in conjunction with the outwardly projecting vertically spaced flange sets of the head define means that automatically engage the connector and retain it to the head while the spring bars are at predetermined angular positions, i.e. are in their operative position. When they are pivoted about vertical axes into other angular positions the connectors are readily removable from the head.

The spring bar connectors pivot about axes that are laterally and/or longitudinally (with respect to the vehicle axis) slightly inclined from the vertical and diverge in a downward direction. During turning maneuvers the heretofore experienced moment that tends to tip the vehicle and applies additional loads to the outside vehicle wheels is thereby reduced or eliminated. Driver anxiety and/or a dangerous loss of control over the vehicle are thereby eliminated.

The spring bars are tapered over their length and can be inexpensively constructed by diagonally cutting them from a rectangular steel plate. They are, therefore, identical and can be constructed without the need for expensive machining operations. During use they can be inverted if they were permanently deformed from overstressing since they are removably retained in a tapered, rearwardly extending aperture of the spring bar connector. Accidental deformation of the bars, therefore, no longer poses the problem of requiring costly repairs before they can be effectively used again.

The spring bar connectors include apertures to which the spring bars are secured. The spring bar size can be changed, for use of the hitch with trailers of varying weights, while using the same connector by simply inserting suitable adapters or sleeves between the connector apertures and the spring bars disposed therein. Alternatively, the connectors and spring bars can be replaced as a unit without the heretofore encountered need for replacing the head.

The present invention also provides convenient and relatively inexpensive means attachable to the trailer bar for tensioning the free aft end of the spring bars. Included is a tensioning lever for conveniently tensioning and releasing the chain. The need for time consuming and exerting work to tension the spring bars, or the need to rely on costly tensioning devices susceptible to malfunctioning is thereby eliminated. The danger of suffering personal injuries is also substantially reduced. Furthermore, objectionable noises emitted by prior art chain tensioning devices are substantially eliminated. The trailer hitch of the present invention employs a solid mounting bar that is independently secured to the vehicle and extends to the aft end of the vehicle. The head is provided with a tubular member that is slipped over the aft end of the mounting bar and to which the main body of the head is secured after the above ground elevation of the head is adjusted to the desired standard height. The tubular member and the main head body are so constructed that the standard hitch heights are attainable even with automobiles having excess or insufficient height to install prior art trailer hitches at the desired elevation without specially constructed and expensive adapters or heads.

Thus, the present invention provides a load equalizing trailer hitch constructed of few and simple components. Heretofore experienced hitch bulkiness, great weight, installation and hitch-up difficulties, repair frequency and malfunctioning are substantially reduced or eliminated. Moreover, the hitch, although substantially more effective than prior art hitches and free of the heretofore encountered safety compromises, is relatively inexpensive.

BRIEF DESCRIPTION OF THE DRAWINGS

FIG. 1 is a plan view of a trailer hitch constructed in accordance with the present invention and shows, in phantom lines, portions of the towing vehicle and the towed trailer;

FIG. 2 is a side elevational view of the trailer hitch illustrated in FIG. 1;

FIG. 3 is a fragmentary, enlarged side elevational view, with parts broken away, of the trailer head illustrated in FIG. 2;

FIG. 4 is a fragmentary enlarged end view of the trailer hitch head;

fig. 5 is a fragmentary enlarged side elevational view of the means for suspending the spring bar tensioning chain from the trailer bar; and FIG. 6 is an elevational view of the suspension device illustrated in FIG. 5.

DESCRIPTION OF THE PREFERRED EMBODIMENTS

Referring first to FIGS. 1 and 2, a towing vehicle such as passenger automobile 8 schematically illustrated in phantom lines has an aft end defined by a bumper 10 and bumper guards 12. A trailer hitch 14 constructed in accordance with the present invention is provided to couple a trailer 16 having a forwardly extending trailer bar 18 to the automobile for the towing of the trailer.

The trailer hitch broadly comprises a mounting bar 20 secured to the underside of automobile 8 and extending rearwardly to and preferably past bumper 10. A hitch head 22 is demountably secured to the aft end of mounting bar 20 with a bolt 24, mounts a ball hitch element 26 on a rearwardly extending substantially horizontal mounting plate or tongue 28 and further mounts a pair of laterally spaced spring bar connectors 30. Elongate, tapered spring bars 31 extend rearwardly from the connectors. Their free aft ends 32 are subjected to an upwardly acting force exerted by tensioned chains 34 anchored to brackets 36 to trailer bar 18. The trailer bar further includes a ball socket 38 for engaging ball element 26 to universally movably couple the trailer bar to the hitch head, the mounting bar and the automobile.

In use acceleration and deceleration forces are transmitted to the trailer via ball 26 and socket 38. The tensioned spring arms apply a moment acting about a substantially horizontal axis to hitch head 22, mounting bar 20 and automobile 8 which reduces the vertical loading of the aft wheels of the auto and correspondingly transfers that loading to the forward wheels as well as back to the trailer wheels. The trailer is disconnected from the automobile by disengaging chain 34 from bracket 36 to release the tension in the chain and relax spring bars 31. The spring bars and spring bar connectors 30 can now be pivoted into laterally outwardly extending positions for their removal as a unit from hitch head 22 for storage during non-use. Withdrawal of pinned or threaded bolt 24 allows removal of head 22 from mounting bar 20 during non-use so that only the mounting bar remains permanently attached to the car. Damage to the hitch during non-use is thereby prevented.

Still referring to FIGS. 1 and 2, a mounting bar 20 comprises an elongate tank bar 40 disposed beneath a gasoline tank 42 of the automobile and extending forwardly to a structural automobile frame member 44 disposed adjacent the rear axle (not separately shown) of the auto. The forward end of the tank bar is welded to the frame member. A portion of the tank bar adjacent its aft end is welded to another frame member 46 of the automobile so that the tank bar clears tank 42. A shank bar 48 has a bifurcated forward end disposed on each upright side of the tank bar, is rigidly secured, e.g. welded to the aft end of the tank bar and projects rearwardly of the tank bar to and/or past bumper 10. A stiffening plate 50 is tack-welded to the underside of tank bar 40 and shank bar 48 to provide mounting bar 20 with lateral rigidity. Frame member 46 can be alternately directly welded to shank bar 48.

Referring now to FIGS. 1 through 4, hitch head 22 comprises a main body defined by an upright channel 52 having laterally projecting, vertically spaced and substantially horizontal, opposing sets of flanges 54 and 56. Rearwardly extending tongue 28 is supported by gussets 60 and includes a bore (not separately shown) through which the shank of ball element 26 extends. Nut 62 fastens the ball to the tongue and the head.

An aft end 61 of a tubular connection member 64 extends between legs 66 of channel 52 and projects forwardly to the web of the channel. The tubular member is sized so that it can be slipped over the aft end of shank bar 48. The shank bar and the tubular member have alignable apertures (not separately shown) through which pinned or threaded bolt 24 is extended for demountably securing the tubular member to the shank bar. The tubular member further includes a flange 68 adjacent to the free end where forces are greatest to strengthen this member. Welds 70 are applied to securely and rigidly connect the tubular member to channel 52.

Upper flanges 54 of each set include downwardly depending cylindrical protrusions 72 while lower flanges 56 are provided with circular bores 74 that are axially aligned with the cylindrical protrusions. Preferably, axes 7 between the protrusion and the bores diverge downwardly and outwardly, as clearly illustrated in FIG. 4, at an angle from about 1° to about 5° from the vertical, and preferably about 2°, for purposes more fully described hereinafter. Alternatively or additionally, the axes slope downwardly and forwardly to the same extent.

To install mounting bar 20 and hitch head 22 a tank bar 40 of a rectangular cross-section is first fitted to the vehicle so that it passes beneath tank 42 and is then welded to frame members 44 and 46. Thereafter, the bifurcated end of shank bar 48 is slipped over the rearwardly projecting end of the tank bar, oriented so that it is located just beneath bumper 10 and welded to the tank bar and to an adjacent frame member if present. The shank bar can be aligned with the tank bar, offset or angularly inclined with respect thereto as required by the configuration of the automobile to which they are mounted. Stiffener 50 is now tacked to the tank and shank bars.

Next, tubular member 64 is slipped over the free end of the shank bar and secured thereto with bolt 24 and channel 52 of head 22 is abutted against flange 68 of the tubular member. The channel is vertically positioned so that ball element 26 is at the desired elevation above ground and element 28 is level. Thereafter legs 66 of the channel are tacked to flange 68 and the strong and solid weld 70 between the flange, the tubular member and the legs and web of the channel are formed to rigidly secure the channel member to the tubular member and head 22 to mounting bar 20. This installation procedure enables substantial variations in the relative positions between channel 52 and tubular member 64 to accommodate variations in the above ground clearance of mounting bar 20 encountered with various automobile models. Aside from the possible adjustments between channel 52 and tubular member 64 additional adjustments can be accommodated by raising or lowering the relative position of the bifurcated end of shank bar 48, or by angularly inclining it before the shank bar is welded to tank bar 40.

Still referring to FIGS. 1 through 4, connector 30 is defined by a central, tubular portion 78 from which upper and lower extensions 80 and 82 extend. The upper extension defines a forwardly facing circularly arcuate, concave surface 84 which extends over no more and preferably less than 180° and which has a radius of curvature congruent to the radius of curvature of the cylindrical exterior of protrusion 72 for engaging the protrusion and enabling slidable movements between the protrusion and the concave surface. The downwardly projecting extension 82 defines a circularly arcuate convex surface 86 which faces rearwardly, that is in the opposite direction of concave surface 84, and which has a radius of curvature congruent to the radius of curvature of core 74 for slidable movement therealong. The portion of the lower extension disposed in bore 74 has a minimum transverse dimension which is less than the diameter of the bore to enable tilting of the connector while the lower extension is disposed in the bore and thus move the concave surface away from the protrusion.

A retention bar 88 depends from the rearward end of upper flange 54 and is spaced from protrusion 72 so that the upper extension of the connector can pass between the protrusion and the retention bar. The retention bar extends laterally away from adjacent channel 52 and has a curved end so that when lower connector extension 82 is in bore 74, the upper extension engages protrusion 72 and tubular connector portion 78 extends rearwardly (as shown in FIG. 3) the retention bar retains the upper extension closely adjacent the protrusion and prevents a tilting of the bar in a clockwise direction (as viewed in FIG. 3). Pivotal movement of the connector from its rearwardly extending operative position away from channel 52 until tubular portion 78 extends laterally of the channel moves upper extension 80 clear of retention bar 88 so that the connector can be tilted downwardly until the upper extension clears upper flange 54. Thereupon the lower extension can be withdrawn from bore 74 to remove the connector from head 22. Installation of the connector requires reversal of the above described steps.

Tubular center portion 78 of the connector defines a rearwardly extending rectangular aperture 90 which tapers from a large aperture end adjacent extensions 80 and 82 to a small aperture end at aft end 92 of the tubular center portion. Spring bar 31, which can be preferably constructed by diagonally slitting a rectangular plate (not separately shown) to provide two identical tapered spring bars without the need for forging, machining or otherwise forming the taper thereon, is inserted in the aperture and has a forward, larger end 91 that is retained to the rectangular aperture of the connector with a Z-shaped sheet metal retainer 94 that has bent over ends to engage the ends of the spring bar and the connector. The rectangular aperture, the large spring bar end and the retainer are so dimensioned that insertion of the spring bar and the retainer in the aperture and complete rearward movement of the spring bar therein results in a tight fit between the tapered sides of the connector, the retainer and the spring bar. Forward movement of the spring bar is prevented by the retainer while aft movement of the spring bar is prevented by the tapered connector and the spring bar sides. The thickness of retainer 94 can be slightly varied to accommodate manufacturing variations in spring bar 91 and/or connector 30.

In use, chain 34 is tensioned to apply an upwardly acting force to free spring bar end 32 and generate the moment transmitted to head 22 and automobile 8 by the upper and lower extensions 80 and 82 of the connector. This moment maintains the concave and convex surfaces 84 and 86 of the connector in firm engagement with the protrusion 72 and bore 74, respectively. When the vehicle-trailer rig moves along a straight highway the moment generated by spring bars 31 more evenly distributes the trailer weight over the wheels of the automobile.

If connectors 30 are pivotable about vertical axes the vertical loads applied to the free aft ends of the spring bars remain substantially constant regardless of the relative angular inclination about a vertical between the vehicle and the trailer. As the angular deflection increases, as during turning maneuvers through increasingly tight curves, the inside spring bar (with respect to the curve along which the vehicle and the trailer travel) and particularly the load applied to its aft end generates a moment about the longitudinal center of the towing vehicle which increases the load on the outside wheels of the towing vehicle. This moment tends to tip the towing vehicle to the outside of the turn, increases its likelihood of skidding and thus reduces the stability of the rig as it moves through a turn. The driver experiences an uncomfortable tipping of the car and has the feeling of loss of control over the car. Thus, the generated moment endangers the rig, particularly during high speed turning maneuvers about relatively sharp curves.

To prevent the formation of this moment about the longitudinal center of the car during turning maneuvers the pivot axes 76 of connectors 30 are inclined from the vertical and diverge downwardly, that is slope downwardly and outwardly with respect to the longitudinal axis of the car, and/or they slope downwardly and forwardly. Pivotal movements between the automobile and the trailer thus cause a downward motion of the spring bar on the outside of the turn which increases the load on the free end of that spring bar. During the turning that spring bar approaches alignment with the longitudinal automobile axis and, therefore, generates a moment about a horizontal axis substantially perpendicular to the automobile axis. The load transferred to the forward wheels of the automobile by that spring bar is thereby increased. Such an increase is substantially equally divided between the two forward wheels and does, therefore, not adversely affect the handling characteristics of the automobile.

The end of the other one of the spring bars, on the inside of the turn, moves upwardly so that the load thereon diminishes. During the turn this spring bar extends transversely to the longitudinal automobile axis and, therefore, generates a moment about the longitudinal axis which increases the load on the outside wheels and decreases the load on the inside wheels of the automobile. The above discussed adverse effects result. However, by inclining pivot axes 76 in the above discussed manner the moment generated by the inside spring bar can be reduced to such an extent that the otherwise experienced adverse effects are eliminated. It will be noted that the decrease in the load equalizing effect of the inside bar is offset by a corresponding increase in the load equalizing effect of the outside bar thus maintaining the overall load equalization substantially constant.

Referring to FIGS. 1, 2, 5 and 6, the present invention also provides means for conveniently applying the upwardly acting force to free spring bar end 32 and for connecting tensioning chain 34 to bracket 36 mounted to trailer bar 16. The bracket has a generally U-shaped configuration and is placed over the trailer bar so that web 96 of the bracket is substantially horizontally disposed while legs 98 depend vertically downwardly from the web. A pair of generally V-shaped hook members 100 are spaced apart by a gap 102 of width slightly greater than the diameter of the chain link rods. The hook members are secured to the downwardly depending legs of the bracket so that their outwardly extending arms together with the legs 98 define a V-shaped notch 104. A pair of hook members are e.g. welded or integrally cast, to each leg but they are vertically offset by about one chain link length so that one of the V-shaped notches is higher than the other one. The legs of the bracket also include vertically spaced threaded bores 106 which receive threaded bolts 108 used to securely tighten the bracket to the trailer bar.

In use the bracket is placed over the trailer bar and bolts 108 are threaded through the bores in the leg disposed on the inside of the trailer bar, e.g. which face towards the longitudinal center of the trailer, while chain 34 is tightened by pulling it upwardly until the desired upward force is applied to free spring bar end 32. Thereafter the chain link which lies flat against the side of bracket leg 98 is placed into V-shaped notch 104 to retain the chain tensioned. The links disposed perpendicularly to the one engaged by hook members 100 extend through a slit 110 in the bracket aligned with gap 102 between the hook members. Should the link disposed immediately above the V-shaped notch when the desired tension force is applied extend perpendicular to the bracket legs so that additional force would have to be applied to the chain or the force would have to be released before a link can be engaged in the V-shaped notch, the bracket is turned around so that the theretofore inwardly facing bracket leg is disposed on the outside. The V-shaped notch is thereby raised or lowered by one chain link length to engage that chain link which lies flat against the bracket leg without the need for substantially increasing or decreasing the chain tension before the chain can be secured to the hook member. Turnaround of course requires placement of bolts 108 in the threaded bores now disposed on the inside of the trailer bar.

Additionally to the chain engaging means the present invention provides means for tensioning and engaging the chain with hook members 100. A pair of parallel, spaced apart channels 112 and 114 are mounted to bracket web 96 so that channel 112 is proximate hook members 100 on the outside of the trailer bar while the other channel 114 is distant from that hook member. Also provided is a tensioning lever 116 which comprises transverse, cylindrical end bars 118 that can be placed into channels 112, 114 for rotation about their axes. The lever extends away from the end bars and includes a chain link engaging projection 120 that extends horizontally and slightly upward. A chain link is engaged with the projection and by pivoting the lever about the end bars in a clockwise direction, as viewed in FIG. 6, chain 34 and free spring bar end 32 are raised and an upward force is applied to them.

The spacing between the cylindrical end bars 118 and projection 120, on one hand and between the outer V-shaped notch 104 and channels 112 and 114 on the other hand are so selected that when the cylindrical end bars are disposed in distal channel 114, the loose chain is engaged with projection 120 and the lever is pivoted in a clockwise direction, chain 34 is raised and tensioned and, simultaneously biased against hook members 100. As the chain is raised projection 120 moves towards and past a vertical alignment with hook members 100 and V-shaped notch 104 thus biasing the chain into the notch. The simultaneous upward movement of the chain increases the upward force applied to the spring bars and causes slidable motion of the chain links over the outside of the hook members. The links oriented parallel to bracket leg 98 slide over the hook members and thereafter pop into engagement with the leg while those links which are perpendicular to the hook member move through gap 102. After the desired tension has been applied the lever is permitted to pivot in a counterclockwise direction, as viewed in FIG. 6, until the next chain link oriented parallel to the bracket leg enters V-shaped notch 104 and is retained by the hook members.

To remove the chain from its engagement with the hook member cylindrical end bars 118 are placed in proximate channel 112 and a chain link is again engaged with projection 120. The relative positioning of the proximate channel is such that the projection is outside the V-shaped notch so that a slight raising of the chain with the lever biases the chain away from bracket 36 and out of engagement with hook member 100. Thereafter the lever is pivoted in a counterclockwise direction, as viewed in FIG. 6, to reduce the chain tension and relax the spring bar.

I claim:

1. A load equalizing trailer hitch comprising in combination: a head having laterally extending flanges, means for receiving a hitch ball, and means for securing the head to a towing vehicle, the flanges defining spaced apart concave and convex flange surfaces facing in opposite directions, a spring bar connector including means rotatably and removably engaging the concave and convex surfaces, and means for securing a spring bar to the connector and means preventing disengagement between the concave and convex flange surfaces and the engaging means when the spring bar extends rearwardly from the head and permitting disengagement of such surfaces and the engaging means when the spring bar extends laterally from the head, whereby rotational movements of the connector in a substantially horizontal plane into a lateral spring bar position permits the removal of the connector from the head and rotational movements of the connector into a rearward, operative position positively retains the connector to the head.

2. A trailer hitch according to claim 1 wherein the concave and convex surfaces are defined by an aperture and a first protrusion on the flanges and have circularly arcuate configurations, and wherein the concave and convex surface engaging means comprise means disposed in the aperture and defining a convex, substantially circularly arcuate connector surface facing in a first direction, and means defining a concave, substantially circularly arcuate connector surface engaging the protrusion and facing in a second, opposite direction.

3. A trailer hitch according to claim 2 wherein the convex connector surface defining means has a minimum transverse dimension substantially less than the transverse dimension of the aperture, and wherein the concave connector surface extends over no more than 180°.

4. A trailer hitch according to claim 3 wherein the means preventing and permitting disengagement comprises a second protrusion spaced from the first protrusion, projecting from the flange from which the first protrusion projects and positioned to engaged the concave surface defining means when the connector is in the predetermined angular position for retaining the concave and convex connector surfaces adjacent the arcuate surfaces of the first protrusion and the aperture, respectively.

5. A trailer hitch comprising: a mounting bar for connection to a towing vehicle, a head removably secured to the mounting bar, the head including means for mounting a hitch ball and sets of opposing, laterally extending, vertically spaced flanges, a pair of spring bars, connection means securing a spring bar to each set of opposing flanges and permitting pivotal movement of the spring bars about laterally spaced upright axes, the connection means including means for the transmission of moments acting about a substantially horizontal axis from the spring bars to the set of opposing flanges, means positively preventing the removal of the connection means from the flanges while the spring bars extend in a direction substantially opposite to the mounting bar and permitting removal of the connection means from the flanges only when the spring bars extend in a lateral direction with respect to the mounting bar, and means for applying substantially vertically acting forces to free ends of the spring bars.

6. A trailer hitch according to claim 5 wherein the spring bars have a maximum thickness at a spring bar end connected to the connection means, wherein the spring bars taper from the maximum thickness towards the free end, and wherein the connection means comprises a connector having a tapered aperture sized to engage a tapered portion of the spring bar adjacent the maximum thickness.

7. A trailer hitch according to claim 6 including means releasably securing the spring bar to the connector to prevent relative motions between the connector and the spring bar when the spring bar is in its operative position and thus retain the spring bar to the connector.

8. A trailer hitch according to claim 7 including retention means for releasably securing the spring bar to the connector, the retention means comprising a Z-shaped member extending through the aperture and having end portion engaging faces of the connector and the spring bar, respectively.

9. A trailer hitch according to claim 5 wherein the spring bars have a substantially rectangular cross-section, and have a substantially continuous, straight line taper from a maximum thickness adjacent a forward end secured to the connection means to a minimum thickness at the free end, and wherein the connection means comprises a connector having an aperture through which the spring bar extends and means for removably retaining the spring bar in the aperture.

10. A trailer hitch according to claim 5 wherein the force-applying means comprises flexible means secured to the free end, a bracket for attachment to a trailer bar, upwardly opening hook means secured to the bracket for engaging intermediate portions of the flexible means, means for tensioning the flexible means to apply the vertically acting force to the free end and for connecting the tensioned flexible means with the hook means, and means for selectively biasing the flexible means towards and away from the hook means to engage or disengage the flexible means while the force is applied to the flexible means.

11. Apparatus according to claim 10 wherein the bracket has a U-shaped configuration, wherein the hook means is secured to a portion of the bracket disposed in a substantially vertical position when the bracket is attached to the trailer bar, and wherein the tensioning means comprises a plurality of upwardly opening channel means secured to the bracket and variably spaced from the hook means, a tensioning lever having an end portion for placement in the channel members and means spaced from the end portion for engaging the flexible means, the engaging means being spaced from the end so that positioning of the lever end in one of the channel means biases the engaged and tensioned flexible means towards the hook means and placement of the end in another one of the channel biases the engaged, tensioned flexible means away from the hook means.

12. A trailer hitch for connecting a trailer having a forwardly extending trailer bar including a ball socket to a towing vehicle having a rearwardly extending mounting bar at an aft end of the vehicle, the hitch comprising:
 a head including a forwardly extending member for connection to the mounting bar, means for mounting a hitch ball to the head, and opposing, vertically spaced flanges projecting from each side of the head;
 spring bar connectors of substantially identical configuration having rearwardly directed openings;
 means defined by the flanges and the connectors for the transmission of moments about substantially horizontal axes between the connectors and the head and permitting pivotal movements of the connectors in a substantially horizontal plane about upright axes;
 retention means positively interengaging the flanges and the connectors over a predetermined relative angular displacement of the connectors about the vertical axes to each side of a rearward orientation of the connector and permitting separation of the connectors and the flanges only when the angular displacement of the connectors about the vertical axes exceeds the predetermined displacement to thereby removably mount the connectors to the head;
 spring bars disposed in the openings and extending rearwardly of the head;
 means demountably retaining the spring bars in the openings; and
 means engageable with the trailer bar for applying an upwardly acting force to free aft ends of the spring bars.

13. A trailer hitch according to claim 12 wherein the spring bars are continuously tapered from a relatively thicker forward end to the relatively thinner aft end, wherein the openings include tapers engaging the forward spring bar ends to limit the rearward movement of the spring bars and thus retain the spring bars to the aperture and the connector.

14. Apparatus for applying upwardly acting forces to aft ends of spring bars of a load equalizing trailer hitch connecting a trailer bar to a vehicle tow bar comprising: a tensioning member connected to the aft end of the spring bar and having sections of greater and lesser width over its length, a U-shaped bracket for placement over the trailer bar, an upwardly and outwardly extending retention member defining a gap through which the relative narrow section can pass while the relatively wider sections are engaged by the retention member, a tensioning lever for applying a force to the tensioning member and including means spaced from an end of the lever for engaging the tensioning member, means disposed on the bracket for positioning and supporting the lever end at positions proximate to and remote from the retention member, the distances between the engaging means and the lever end and between the positioning means and the retention member being such that the tensioned member connected to the engaging means is biased away from the retention member when the lever end is positioned in the proximate means and is biased into engagement with the retention member when the end is positioned in the remote means, and means for securing the bracket to the trailer bar.

15. A trailer hitch comprising: A mounting bar for connection to a towing vehicle, a head movably secured to the mounting bar, the head including means for mounting a hitch ball, a spring bar, the spring bar having a substantially rectangular cross section and a substantially continuous, straight line taper from a maximum thickness at the aft, free end of the bar, a connector for the spring bar secured to the head, the connector having an aperture through which the spring bar extends and means for removably retaining the forward end of the spring bar in the aperture so that a remainder of the spring bar extends rearwardly from the connector, the connector permitting pivotable movement of the spring bar about a laterally spaced upright axis, the connector further including means for the transmission of moments acting about substantially horizontal axis from the spring bar to the head, and means for applying substantially vertically acting forces to the free end of the spring bar.

* * * * *